US006442885B1

(12) United States Patent
Payne

(10) Patent No.: US 6,442,885 B1
(45) Date of Patent: Sep. 3, 2002

(54) MOTION DECOY SYSTEM

(76) Inventor: Kenneth William Payne, 7073 Via Ramada Ct., San Jose, CA (US) 95139

( * ) Notice: Subject to any disclaimer, the term of this patent is extended or adjusted under 35 U.S.C. 154(b) by 0 days.

(21) Appl. No.: 09/800,938

(22) Filed: Mar. 6, 2001

(51) Int. Cl.⁷ .............................................. A01M 31/06
(52) U.S. Cl. ........................................................ 43/3
(58) Field of Search ........................ 43/3, 2, 26.1, 26.2

(56) References Cited

U.S. PATENT DOCUMENTS

| | | | |
|---|---|---|---|
| 1,831,286 A | * 11/1931 | Chelini ............................ 43/3 |
| 2,547,286 A | * 4/1951 | Sabin .............................. 43/3 |
| 4,535,560 A | * 8/1985 | O'Neil ............................ 43/3 |
| 4,660,313 A | * 4/1987 | Bauernfeind et al. ............ 43/3 |
| 4,910,905 A | * 3/1990 | Girdley et al. ................... 43/3 |
| 5,074,071 A | * 12/1991 | Dunne ............................ 43/3 |
| 5,168,650 A | 12/1992 | Martin |
| 5,974,720 A | * 11/1999 | Bowling .......................... 43/3 |
| 6,079,140 A | 6/2000 | Brock |
| 6,138,396 A | * 10/2000 | Capps ............................ 43/3 |
| 6,170,188 B1 | * 1/2001 | Mathews ......................... 43/3 |
| 6,212,816 B1 | * 4/2001 | Babbitt et al. ................... 43/3 |

FOREIGN PATENT DOCUMENTS

GB 2244199 * 11/1991 ........................ 43/2

* cited by examiner

Primary Examiner—Peter M. Poon
Assistant Examiner—David Parsley
(74) Attorney, Agent, or Firm—Intellectual Property Law Offices of S. Alex Liao; S. Alex Liao

(57) ABSTRACT

A motion decoy system is provided to attract a desirable quarry of waterfowls. The system includes a shaft having a plurality of arms and an outer bearing tube rotatably attached to each arm. Each adjacent arm points to an opposite direction to each other. The shaft is rotatably supported under a body of water in a target area by multiple supporting posts. A plurality of floating decoys placed upon the water is operatively attached to the bearing tube by a guide wire. A motor is supported by multiple supporting posts beneath the water. The shaft is operatively attached to the motor. The motor is electrically controlled by a user, whereby the motor imparts rotation movements upon the shaft in response to control signals from the user, whereby rotations of the arms of the shaft causing animated movements of the decoys to attract the quarry of waterfowls, wherein the animated movement simulates feeding activities of ducks, geese, or other waterfowls.

12 Claims, 2 Drawing Sheets

MOTION DECOY SYSTEM

1. FIELD OF THE INVENTION

The present invention relates to a system for animating floating decoys used to attract waterfowls and the like. In particular, the invention relates to a simplified system for simultaneously simulating feeding activities of several decoys in a natural environment to attract waterfowls.

2. BACKGROUND OF THE INVENTION

For duck hunters, it is crucial that they maintain a target site that appears natural and safe so that potential victims of games or waterfowls may arrive at the site. Waterfowls like ducks or geese are very sensitive to a dangerous environment and are alert to human presence or activities. For this reason, hunters normally wear camouflage outfits at the target site and also utilize blinds and/or other concealment devices. In addition, hunters usually place floating decoys upon a body of water in the target area in the vicinity of their blinds in order to enhance the appearance of a natural and safe environment. A duck or goose call is frequently used by the hunters to attract flying waterfowls to land on the water or the nearby areas within the shooting range of shotguns. Normally, duck hunters may employ 4–16 decoys while geese hunters use especially large numbers of decoys.

Conventional decoys for waterfowls typically have a buoyant body and an anchor attached thereto. U.S. Pat. No. 5,168,650 issued to Wayne F. Martin on Dec. 8, 1992 describes a decoy system. The claimed decoy system includes a buoyant body and an anchor attached to the body through a collapsible cord. While the anchor holds the decoy on the body of water, the decoy appears motionless and lifeless thereupon to attract potential victims of waterfowls. water, the decoy appears motionless and lifeless thereupon to attract potential victims of waterfowls.

Great efforts have been made to achieve life-like decoys in recent years. U.S. Pat. No. 6,079,140 ("'140 patent") issued to Robert C. Brock on Jun. 27, 2000 describes a motion system for decoys. The device claimed in the patent employs a frame to which decoys are secured. The frame relies upon the floating decoys to suspend in the water. The frame includes a mounting system for a motor with a propeller. The propeller is placed perpendicularly to the surface of the water. When the propeller is in motion, the frame will be forced towards the bottom of the water. Accordingly, the frame drags the decoys' frontal part to submerge into the water, simulating feeding activities of waterfowls. However, the device claimed in '140 patent appears to be complex and involves a great deal of materials, hence the higher costs of production.

Therefore, there exists a need in the art to have an effective and efficient motion system for decoys, which is easily deployable and less costly to manufacture.

3. SUMMARY OF THE INVENTION

It is therefore the object of the present invention to provide an effective animating decoy system to attract waterfowls. Said decoy system with a plurality of animating decoys simulates feeding activities of waterfowls.

It is another object of the present invention to provide a simplified, less-costly and effective decoy system for waterfowl hunters.

It is yet another object of the present invention to provide a method for waterfowl hunters to attract waterfowls to a target area.

Therefore, according to the first aspect of the invention, a motion decoy system is provided to attract a desirable quarry, said system:

comprising a plurality of floating decoys adapted to place upon a body of water in a target area, a shaft having a plurality of arms and an outer bearing means rotatably attached to each said arm, said shaft being rotatably supported under said body of water by a first supporting means, said decoy operatively attached to said bearing means;

a motor supported by a second supporting means beneath said body of water, said motor operatively attached to an end of said shaft, said motor being electrically controlled by a user, whereby said motor imparts rotation movements upon said shaft in response to control signals from said user, whereby rotations of said arm causing animated movements of said decoy to attract said quarry, wherein said animated movement simulates feeding activities of ducks, geese, or other waterfowls.

Therefore, according to the second aspect of the invention, a method of attracting a quarry of waterfowls to a target area is provided, comprising the steps of:

deploying a plurality of floating decoy adapted to place upon a body of water in a target area;

preparing a shaft having at least an arm and an outer bearing means rotatably attached to each said arm, said shaft being rotatably supported under said body of water by a first supporting means, said each decoy operatively attached to said bearing means;

preparing a motor supported by a second supporting means beneath said body of water, operatively attaching said motor to an end of said shaft, electrically controlling said motor by a user, whereby said motor imparts rotation movements upon said shaft in response to control signals from said user, whereby rotations of each said arm causing animated movements of each said decoy to attract said quarry.

4. BRIEF DESCRIPTION OF THE DRAWINGS

5. DETAINELD DESCRIPTION OF THE PREFERRED EMBODIMENTS

Figure 1:
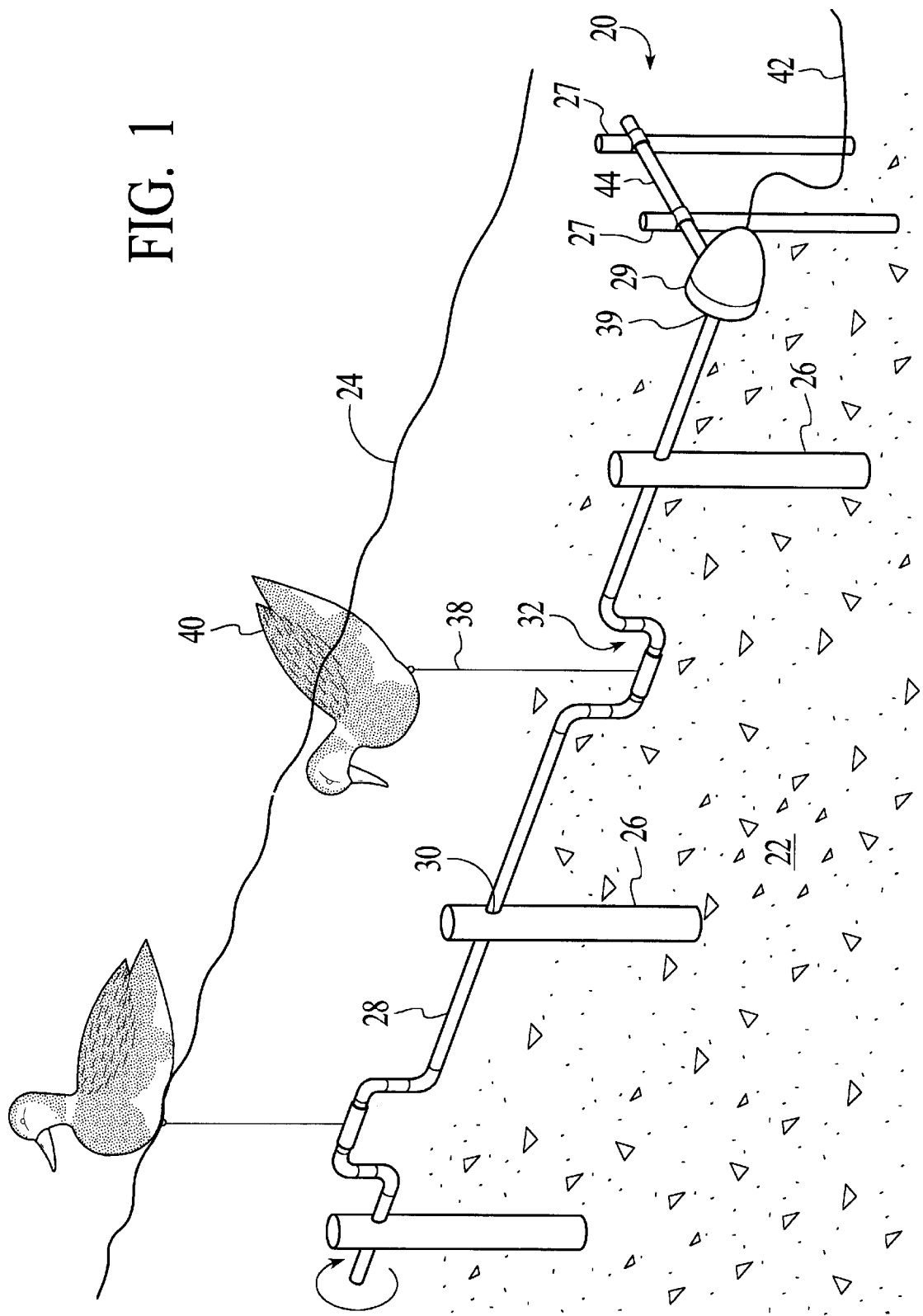
FIG. 1 is a general view of the device.

Referring to FIG. 1, the motion decoy system is generally designated by reference numeral 20. The motion decoy system 20 is adapted to animate multiple decoys simultaneously to attract waterfowl and the like.

The motion decoy system 20 is placed at the floor 22 of the body of water 24. Preferably, the system 20 is securely affixed to the floor 22 of the water 24 by two sets of supporting posts 26 and 27. The first set of supporting posts 26 supports the shaft 28, while the second set of supporting posts 27 supports a motor 29. The motor 29 used in this invention is a 12-volt motor, which is normally used in small trolling boats and is commercially available. The bottom ends of the supporting posts 26 for the shaft 28 are securely affixed to the floor 22 of the water 24. There is a see-through hole 30 near the top end of each supporting post 26 for the shaft 28. The shaft 28 is rotatably placed through the hole 30 and is rotatably supported by the supported by the supporting posts 26. Preferably, the supporting posts 26, 27, and shaft 28 are made of plastics materials. Other materials such as fiberglass or stainless metals, can be used for making the posts 26, 27, and shaft 28. The shaft 28 has multiple arms 32. Each arm 32 adjacent to each other and positioned on the shaft 28 points to a direction. Preferably, each of the adjacent arm 32 points to a different direction to each other. An enlarged view of an arm 32 is displayed in FIG. 2.

A preferred embodiment for making the shaft 28 is provided. After a bearing tube 36 rotatably slides onto the shaft 28, the shaft 28 is curved or bent around the bearing tube 36 to form the arm 32 with a bearing tube 36 on the arm 32. Additional arms 32 can be made on the shaft 28 in the same manner accordingly.

Figure 2:
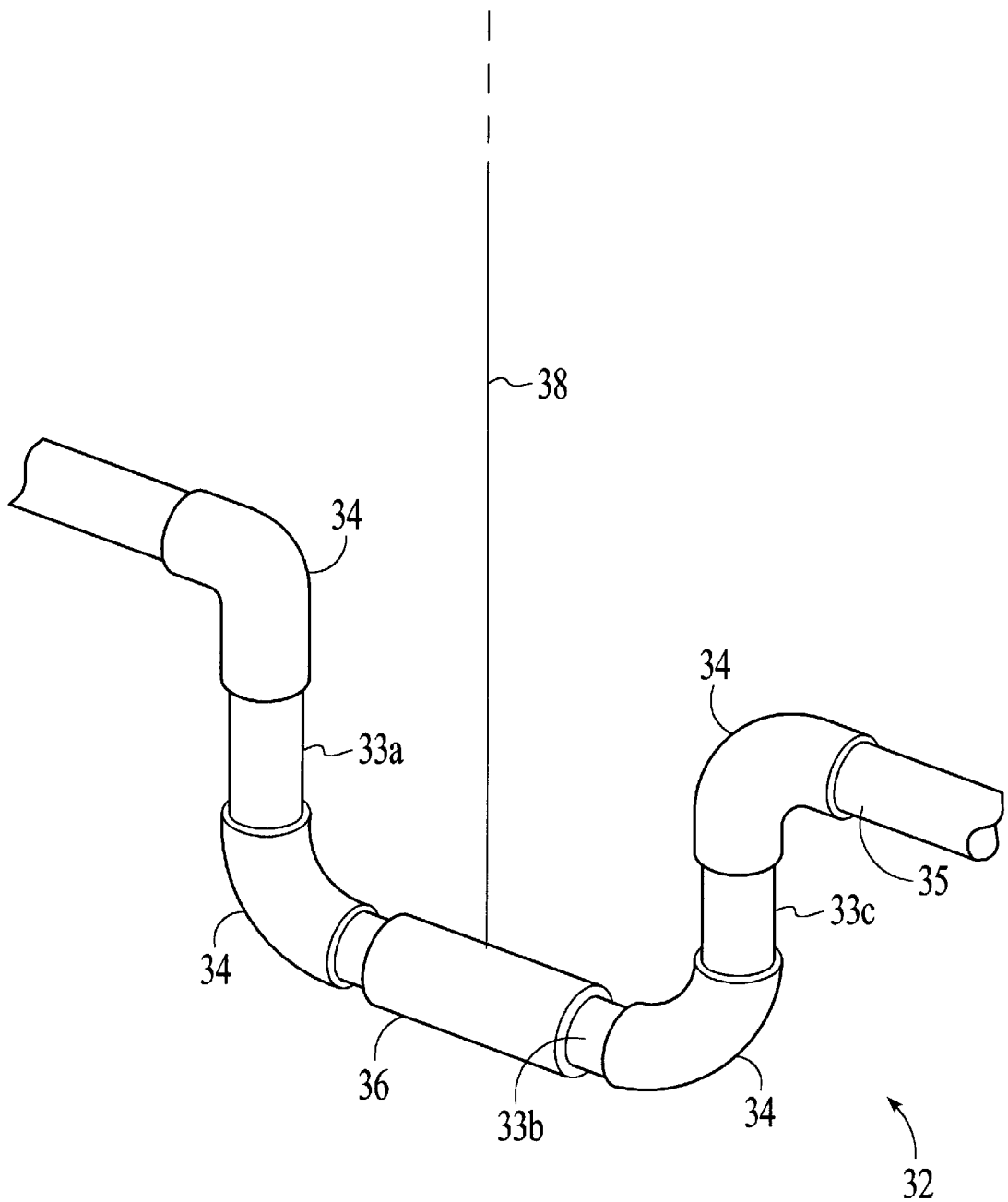
FIG. 2 is an enlarged view of an arm on the shaft.

Another preferred embodiment is displayed in FIG. 2. Referring to FIG. 2, the arm 32 consists of four corner connectors 34 and three arm pieces of tubing 33a, 33b, and 33c. The connectors 34 connect the arm pieces 33a and 33c with the shaft 28. There is a bearing tube 36 rotatably attached to the arm piece 33b. A guide wire or string 38 connects the bearing tube 36 and a buoyant decoy 40 as shown in FIG. 1. The length of the string 38 is adjusted so that when the arm 32 moves closer to the floor 22, the decoy's frontal part is dragged to submerge into the water 24. When the arm 32 moves closer to the surface of the water 24, the decoy 40 will have the full body above the water 24. Because the two adjacent arms 32 are pointing to opposite directions, a decoy 40 will have the full body, including the head, up above the water when an adjacent decoy 40 has its head submerged into the water 24, animating feeding activities of waterfowl. The decoys 40 are conventional floating decoys of the type commercially available.

Referring further to FIG. 2, preferably, the connector 34 is threaded interiorly at both ends, which connects the exteriorly threaded end 35 of the shaft 28 and the threaded end of the arm pieces 33a and 33c. Preferably, all pieces of the arm 32, bearing tube 36, and connectors 34 are made of plastic materials. Other materials, such as fiberglass or stainless metals, can be used for making those parts of the system 20.

Referring further to FIG. 1, one end 39 of shaft 28 is securely and operatively attached to the motor 29. The motor 29 is electrically manipulated by a user through an electrical cord 42. The motor 29 can also be attached to a timer, which turns on or off the motor at a set time interval. The motor 29 is securely attached to a crossbar 44. The bottom ends of the supporting posts 27 are securely affixed to the floor 22 of the water 24. The crossbar 44 is then securely attached to the top end of the supporting posts 27.

When the motion decoy system 20 is in operation, the motor 29 drives the shaft 28 to rotate. The rotation movement of one of the arms 32 drags the frontal part of the buoyant decoy 40 to submerge into the water, while an adjacent arm 32 releases the buoyant decoy 40 back to the surface. The movement of the decoys 40 simulates the feeding activities of waterfowls. In addition, the rotation of the arms 32 coupled along with the animated feeding activities generates some ripple effects on the surface of the water 24. Such activities and the ripple effects give the target area a natural and safe appearance so that the potential victims of waterfowls will approach or land on the target area. Typically, other conventional motionless decoys are also scattered around on the same body of water. The ripple effects from the motion decoy system will cause the motionless decoys to move and further attract potential victims to approach.

While the present invention has been disclosed in details above, the invention is not intended to be limited strictly to the invention as disclosed. It is apparent that those skilled in the art may presently make many uses and modifications described herein without departing from the spirit and scope of the inventive concepts.

What is claimed is:

1. A motion system for decoys to attract a desirable quarry, said system comprising:
   at least a floating decoy adapted to place upon a body of water in a target area;
   a shaft having at least an arm and an outer bearing means rotatably attached to said arm, said shaft being rotatably supported under said body of water by a first supporting means, said decoy operatively attached to said bearing means;
   a motor supported by a second supporting means beneath said body of water, said motor operatively attached to an end of said shaft, said motor being electrically controlled by a user, whereby said motor imparts rotation movements upon said shaft in response to control signals from said user, whereby rotations of said arm causing animated movements of said decoy to attract said quarry.

2. The system according to claim 1, wherein said animated movement simulates the feeding activities of ducks or geese or other waterfowls.

3. The system according to claim 1, wherein said decoy is attached to said bearing means by a string.

4. The system according to claim 1, wherein said at least a floating decoy comprises a plurality of floating decoys.

5. The system according to claim 1, wherein said at least an arm comprises a plurality of arms positioned adjacent to each other, each adjacent arm pointing to different directions.

6. The system according to claim 1, wherein said first supporting means comprises a plurality of supporting posts each having a top end and a bottom end, said bottom end being securely affixed into the bottom of said body of water, each said post having a see-through hole near said top end of each said post, whereby said shaft passes through said hole and is rotatably supported by each said post.

7. The system according to claim 1, wherein said second supporting means comprises a cross bar and a plurality of supporting posts, each said post having a top and bottom end, said bottom end being securely affixed to the bottom of said body of water, said cross-bar being securely attached to said top end of each said post.

8. The system according to claim 1, wherein said bearing means is a tube made of plastics materials.

9. The system according to claim 1, wherein said shaft is made of plastics, fiberglass, or stainless materials.

10. The system according to claim 1, wherein said motor is a 12-volt trolling motor.

11. The system according to claim 1, wherein said arm is made of plastics materials.

12. A method of attracting a quarry of waterfowl to a target area comprising the steps of:

deploying at least a floating decoy adapted to place upon a body of water in a target area;

preparing a shaft having at least an arm and an outer bearing means rotatably attached to said arm, said shaft being rotatably supported under said body of water by a first supporting means, said decoy operatively attached to said bearing means;

preparing a motor supported by a second supporting means beneath said body of water, operatively attaching said motor to an end of said shaft, electrically controlling said motor by a user, whereby said motor imparts rotation movements upon said shaft in response to control signals from said user, whereby rotations of said arm causing animated movements of said decoy to attract said quarry.

* * * * *